United States Patent [19]

Bose et al.

[11] Patent Number: 4,842,803
[45] Date of Patent: Jun. 27, 1989

[54] METHOD AND APPARATUS FOR EXTRUDING BLOWN THERMOPLASTIC FILM TUBES

[75] Inventors: Ajit K. Bose, Lawrenceville; Kurt F. Strater; Kenneth S. Geick, both of Trenton, all of N.J.

[73] Assignee: Union Camp Corporation, Wayne, N.J.

[21] Appl. No.: 173,692

[22] Filed: Mar. 25, 1988

[51] Int. Cl.$^4$ .............................................. B29C 47/88
[52] U.S. Cl. .................................... 264/565; 264/566; 264/567; 264/569; 425/72.1; 425/326.1; 425/379.1
[58] Field of Search ................................ 264/565-569; 425/72.1, 326.1, 379.1

[56] References Cited

U.S. PATENT DOCUMENTS

| | | | |
|---|---|---|---|
| 3,754,067 | 8/1973 | St. Eve et al. | 264/237 |
| 4,399,094 | 8/1983 | Fujitani et.al. | 425/72.1 |
| 4,479,766 | 10/1984 | Planeta | 264/569 |
| 4,606,879 | 8/1986 | Cerisano | 425/72.1 |
| 4,624,823 | 11/1986 | Audureau et al. | 425/72.1 |
| 4,626,397 | 12/1986 | Bose | 425/72.1 |
| 4,632,801 | 12/1986 | Dowd | 425/72.1 |

FOREIGN PATENT DOCUMENTS

| | | | |
|---|---|---|---|
| 59-39524 | 3/1984 | Japan | 425/326.1 |
| 61-235128 | 10/1986 | Japan | 425/326.1 |

Primary Examiner—Jeffery Thurlow
Attorney, Agent, or Firm—Edward J. Sites

[57] ABSTRACT

The rate for producing blown films of thermoplastic resins may be increased by using the extrusion and blowing apparatus of the invention, which includes a means of rapidly cooling the blown film at points both above and below the bubble frost line.

11 Claims, 2 Drawing Sheets

METHOD AND APPARATUS FOR EXTRUDING BLOWN THERMOPLASTIC FILM TUBES

BACKGROUND OF THE INVENTION

1. Field of the Invention

The invention relates to methods and apparatus for the extrusion of tubular, thermoplastic resin films.

2. Brief Description of the Prior Art

The prior art literature is replete with descriptions of methods and apparatus for extruding tubular films of thermoplastic resins. Representative of such descriptions are those found in the U.S. Pat. Nos. 3,7754,067; 4,479,766; 4,626,397; and the Japanese Pat. No. 84-058454/10.

The U.S. Pat. No. 3,754,067 (D.R. St. Eve et al.) issued Aug. 21, 1973 describes tubular film extrusion apparatus which includes a first cooling means for cooling the molten extrudate to a temperature above the crystalline formation temperature. A second cooling means follows annealing to solidify the film.

The apparatus described in the U.S. Pat. No. 4,479,766 (Planeta) issued Oct. 30, 1984 is relatively sophisticated, employing a second cooling means or air ring which may be moved along the length of the extruded tube (below the point of tube expansion) for obtaining a stable tube.

The U.S. Pat. No. 4,626,397 (Bose) issued Dec. 2, 1986 describes an improved method and apparatus, including a plurality of cooling means, for obtaining biaxially oriented high density polyethylene blown films. The improvement resides in control of physical properties in the extruded product.

The Japanese Pat. No. 84-058454/10 is worthy of mention for its disclosure of apparatus for extruding blown films of synthetic polymeric resins, which includes a mechanical means for controlling the rate of air flow (cooling means) directed at the molten tube as it leaves the extruder die.

The apparatus and the method of the present invention is useful to obtain blown films of thermoplastic resins, especially polyethylene, having predetermined physical properties, e.g. tear, impact, tensile and elongation strengths. The apparatus and method of the invention represent an improvement and advance in the art, enabling one to achieve higher production rates without loss of desired physical properties. As an example, speeds attainable using the apparatus of U.S. Pat. No. 4,626,397 are generally in the range of from 150 to 180 feet per minute. However, production speeds obtainable by use of the method and the apparatus of the present invention may reach about 220 feed per minute, without loss of physical properties in the product or any increase in breakage rates during production.

SUMMARY OF THE INVENTION

The invention comprises apparatus for extruding a tubular film of a thermoplastic, polymeric resin, which comprises;

extruder means for providing a thermally plasticized, thermoplastic polymeric resin;

a shaping die associated with the extruder means, for shaping the thermally plasticized resin into a hollow tube of a substantially uniform first diameter and for discharging the shaped resin on a predetermined, axial pathway;

a first annular nozzle radially disposed about the outer periphery of the pathway, at a point adjacent to the site of discharge;

means of delivering a cooling gas to the annular nozzle for release to the outer periphery;

said annular nozzle being constructed and positioned to direct the delivered cooling gas to the outer surface of the shaped resin at the side of discharge;

a second annular nozzle radially disposed about the outer periphery of the pathway, at a point spaced apart from the first annular nozzle;

second means for delivering a cooling gas to the second annular nozzle for release to the outer periphery;

said second annular nozzle being constructed and positioned to direct the cooling gas delivered by the second means to the outer surface of the shaped resin at a point spaced from the site of discharge;

means for expanding the diameter of the thermally plasticized shaped resin at a point on the pathway beyond the first and second annular nozzles;

a sleeve housing enclosing the pathway over which the thermally plasticized, shaped resin of expanded diameter travels;

said sleeve housing defining an annular chamber between the housing and the periphery of the pathway over which the shaped resin of expanded diameter travels;

said annular chamber being in fluid communication with the second annular nozzle; and vent means providing gas communication between the annular chamber and the exterior of the sleeve housing.

The invention also comprises a method of extruding a blown film of a thermoplastic resin, employing the apparatus of the invention.

DETAILED DESCRIPTION OF THE PREFERRED EMBODIMENTS OF THE INVENTION

The apparatus and the method of the invention are useful for the extrusion of resinous thermoplastic materials, especially biaxially oriented, high density polyethylene film in which an additional secondary gaseous cooling medium is applied at strategic strain inducing locations of a blown bubble of film, to control the final product properties of the extruded and blown material.

Although the apparatus and the method of the invention may be used to extrude a wide variety of thermoplastic resins, including polyolefins, polycarbonates, polysulfones and the like, the following description will be made of the preferred polyethylene processing. Those skilled in the art will gain an appreciation of the invention from a reading of the following description in conjunction with a viewing of the accompanying drawings.

Figure 1:
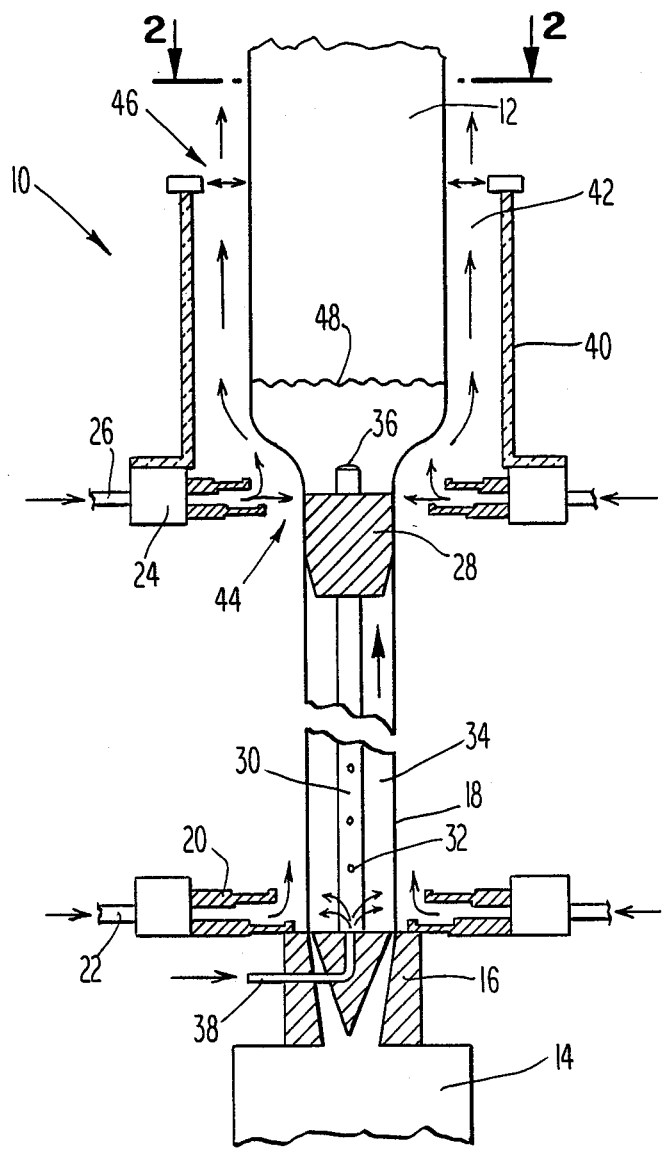
FIG. 1 is a cross-sectional side elevation of an embodiment apparatus of the invention, shown during operation.

FIG. 1 is a cross-sectional side elevation of an mbodiment apparatus 10 of the invention, in operation to fabricate a blown film of a thermoplastic polymeric resin 12. The apparatus 10 includes a conventional extruder 14 (shown partially) for thermally plasticizing a thermoplastic polymeric resin. A shaping die 16 receives the thermally plasticized resin and discharges it as a hollow, tubular film stalk 18 of substantially uniform diameter. The stalk 18 conforms generally in diameter to the diameter of the die 16 and extends along an axial pathway a distance equal to 5 to 8 diameters of the die 16 (depending on the nature of the resins, ambient temperatures and line speed). For example if the die 16 is 6" in diameter the stalk 18 height would be approximately 8 times that diameter or 48".

At the site of stalk 18 discharge from the die 16 there is positioned an annular nozzle 20 which is in closed gas communication through conduit 22 with a source of a cooling gas (not shown in FIG. 1) such as chilled air. The nozzle 20 delivers the cooling gas to the outside periphery of the stalk 18 at the die 16 discharge site. In operation, sufficient gas volume and velocity (dependent on the gas temperature) is delivered to the outer surface of stalk 18 to cool the thermally plasticized resin to a temperature at which it is still flowable (molten), but of sufficient solidity (stability) to continuously advance along the axial pathway (as shown in the FIG. 1) without substantial deformation. The arrow on stalk 18 as shown in FIG. 1 depicts the movement of the stalk 18 along the pathway as it is discharged from the die 16.

Spaced apart from the annular nozzle 20 and distally further along the pathway of stalk 18 is a second annular nozzle 24 which is in closed gas communication with a source of a cooling gas (not shown in FIG. 1) such as chilled air. The nozzle 24, like nozzle 20 delivers the cooling gas to the outer surface of the moving stalk 18 for a second, further cooling of the resinous stalk 18. The cooling gas source for nozzles 20,24 may be compressed air (generally chilled) provided at velocities within the range of from 500 to 6000 cubic feet per minute (CFM).

Utilization of the secondary gaseous cooling at a certain velocity (for example 800-1000 cfm) in conjunction with an internal bubble stabilizer (IBS) 28 or other surface inducing drag placed at the end of the machine direction orientation zone where crystallite and amorphous areas undergo induced strain and get frozen in the amorphous areas, is advantageous and ensures proper deformation rate dt/d0 (t=thickness; 0-time). Resulting product film shows better tensile, yield and modulus balance, enables a control over tear and gives superior impact properties. The shrink force around the drag surface of IBS 28, the internal force from entrapped air and the nip speed or draw velocity of the film, creates the necessary strain on the highly knitted molecular lattice work possessed by polymers of high densities. The orientation is effective since the plasticized mass is still in a slightly cooled fluid state but above the crystallization set point. The induced strain is frozen in.

Depending on the molecular weight and molecular weight distribution of a resin, the positioning of the second cooling gas nozzle 24 to give optimum properties may vary as follows, using high density polyethylene resin.

| Resin Density | Resin Melt Index | Height of Nozzle 24 on Stalk 18 |
|---|---|---|
| 0.954 | 0.06 | 1" to 3" + (6" to 8"8 × die diameter in inches) |
| 0.953 | 0.05 | 2" to 3" + (6" × die diameter in inches) |
| 0.953 | 0.10 | 2" to 3" + (6" × die diameter in inches) |
| 0.953 | 0.10 | 2" to 3" + (6" × die diameter in inches) |

Polymer melt emerging through a die gap (0.045") at, for example, 420° F. undergoes a die-swelling approximately 5-15% depending on the resin used. Molten polymer may be drawn at a draw velocity approximately ⅓ to ½ of the line speed at about 1:1 B.U.R. over the internal shaper or bubble stabilizer 28 which is connected to the top of the die 16 by a hollow shaft 30. The hollow shaft 30 with side holes 32 provides an open internal area 34 between the top and bottom of the stalk 18. At startup, a plug is placed on top to slightly expand the stalk 18 and wrap it over the IBS 28. At this point the plug is taken off, which allows the addition of air to get a required lay flat width. A 0.045" polymelt form die top gets drawn out to 0.006"-0.008" at the end of the IBS 28 and gets partially cooled (slight shrinkage takes place). The diameter of the IBS 28 is advantageously 1:1 to die 16 size. The shrinkage of the stalk 18 now creates additional drag on the internal face of the stalk 18. Above this point, transverse blowing occurs until a desired expansion of the product diameter has been achieved. The blowing occurs when air is released under pressure from the open end 36 of the shaft 30. The pressurized air is carried from a source (not shown in FIG. 1) through the conduit 38. The product blown tubular film 12 is advanced continuously, along an extension of the axial pathway of stalk 18, at a rate to maintain the stalk 18 and product film 12 integrity. The bubble size may be controlled by the pressure of air delivered from shaft 30 as will be appreciated by the skilled artisan. The stalk 18 primary cooling at nozzle 20 and subsequent progressive thinning out of the stalk 18 wall thickness gives some machine direction strain. At this point the internal drag of the line velocity along with internal air pressure takes over (3.2-4.5 B.U.R.) as the diameter increases from 1:1 B.U.R. to required B.U.R. Thinning of the tube to a desired gauge occurs here. This critical zone, where transverse direction strain is created, undergoes additional cooling at nozzle 24 to freeze the resulting orientation. An MD/TD balance will give bi-axially oriented films.

The nozzle 24 is advantageously operated to provide a low volume-high velocity gas flow. Using a concentrated cooling gas at a closer surface with a velocity of 800-1000 cfm creates a fast quench on the transverse orientation area. The heat transfer ratio $h_c$ is dependent on Reynolds number (which is governed by the velocity of the cooling fluid).

The nozzle 20 preferably has approximately the same diameter as the die 16. Although a second nozle 24 with the same diameter as the nozzle 20 will operate, it has been found that improved results are obtained if the nozzle 24 is 1.3 to 1.6 times the diameter of the nozzle 20 (in round numbers).

The nozzle 24 encircling the stalk 18 may be mounted to travel along the stalk 18 length from the nozzle 20 to the top of the stalk 18 depending on the resin used and the line output. This nozzle 24 can merely introduce low pressure, high volume air (not at high velocity) against the stalk. While the nozzle 20 is generally used to blow ambient air (70°-90° F.) against the stalk 18, the second nozzle 24 is generally used to deliver refrigerated plant air (40°-50° F.). This second nozzle 24 may be used over the stalk 18 distance up to the base of the tulip (transverse orientation, blow up area).

It has been found that by changing the position of the second nozzle 24 along the hollow tube 30 and directing cooled air at predetermined areas of the tube and the melt will be partially cooled at the flex point where transverse direction (TD) or orientation takes over and freezes the melt. This serves to change the ratio of machine direction (MD) properties to TD properties.

Immediately above the nozzle 24 and attached to the upper side is a sleeve housing 40 which circumscribes and encloses the extended pathway of the stalk 18, beginning at a point adjacent to the base of the tulip previously referred to and where the stalk 18 is expanded into a bubble, also as previously described. The sleeve housing 40 is substantially closed, defining a chamber 42 between the bubble of film product 12 and the housing 40. The chamber 40 is in open gaseous (fluid) communication with the nozzle 24 so that at least a portion of cooling gas delivered by nozzle 24 is directed into the chamber 42. As shown in the preferred embodiment apparatus 10, a portion of the cooling gas delivered by nozzle 24 escapes to the environment through the passage 44. The body of cooling gas directed into the chamber 42 forms a plenum in flowing contact with the outer surface of the bubble product 12 and escapes through an annular vent 46. During passages through the chamber 40, the plenum of cooling gas serves to maintain a controlled volume of cooling gas flowing about the bubble product 12 at a zone above and immediately below the frost line 48. In this way it is possible to substantially stabilize the tubular film as it is being processed through the critical zone where it is transformed from the molten stage (below the frost line) to where it fully solidifies as it passes the frost line 48. This was not heretofore possible, in that ambient change in air pressure, temperature and the like would cause variations with regard to the movement of the tube 12 after it passed the second nozzle 24. This resulted in a flat size, that is, the tube width will vary and also excessive fluttering of the extruded tube occurs so as to cause breakage. By using of the cylindrical sleeve 40 it is possible to provide a non-contact compensation air pocket about the product tube 12, which stabilizes the extruded tube and allows for accelerated speeds through the apparatus 10. The result is a higher production rate without loss of desired physical properties or an increase of machine breaks.

The sleeve housing 40 is preferably made of a transparent material; such as, Plexiglas or the like to allow observation of the extruded film within. It should be noted that the frost line 48 is in a position adjacent to nozzle 24 and intermediate between the second nozzle 24 and the terminal end of the housing 40.

Figure 2:
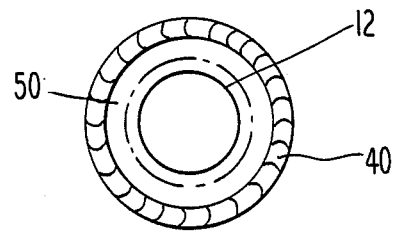
FIG. 2 is a view along lines 2—2 of FIG. 1, showing a means of adjusting the flow of cooling gas venting from the apparatus of the invention.

In a more preferred embodiment apparatus 10 of the invention, the vent 46 opening is adjustable to control the volume and velocity of cooling gas exiting the chamber 42. As shown in FIG. 2, an iris shutter 50 may be mounted on the vent 46, for mechanically adjusting the vent 46 dimension.

The continuously advancing blown film 12 is taken up on a reel, with the bubble deflated, in a conventional manner (not shown in FIG. 1).

FIG. 2 is a view along lines 2—2 of FIG. 1 and shows a shutter 50 mounted to control the dimension of the vent 46. The shutter 50 is shown in its maximum open position for maximum venting. The phantom line in FIG. 2 illustrates a partially closed position of the movable shutter 50 to reduce the vent 46 opening. The adjustable nature of the vent 46 opening gives control of the rate of cooling provided by the plenum of cooling gas passing through the chamber 42.

Figure 3:
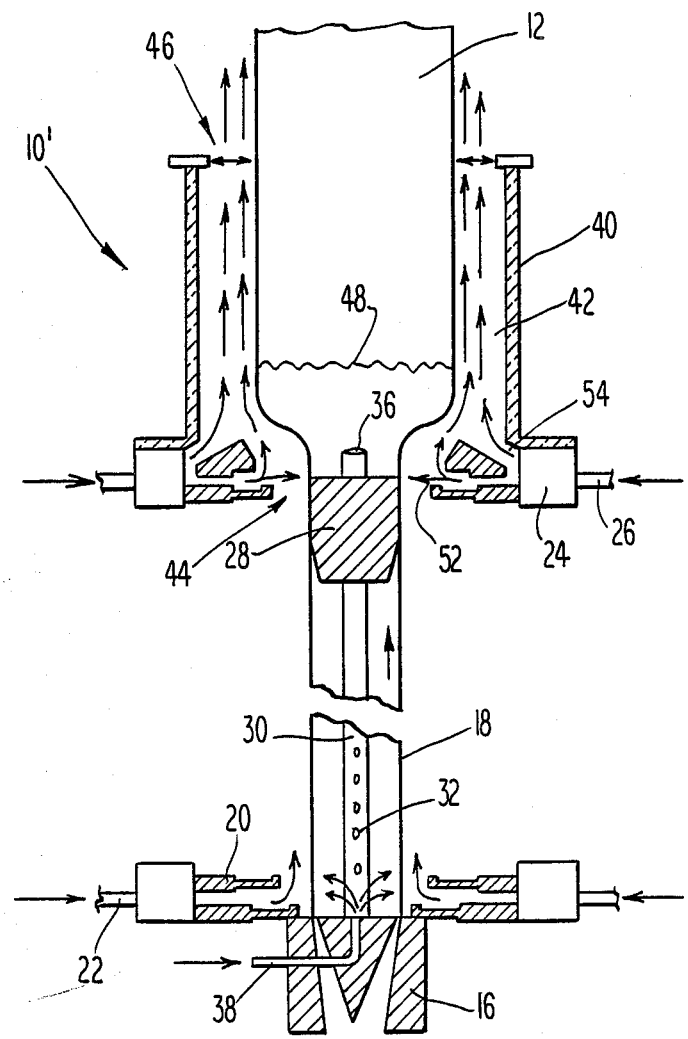
FIG. 3 is a view as in FIG. 1, but of another embodiment apparatus of the invention.

FIG. 3 is a view as in FIG. 1, but of another embodiment apparatus 10' of the invention. The difference between the embodiemnt apparatus 10' and the embodiment apparatus 10 is that the second nozzle 24 includes both an orifice 52 which is directed at the product 12 tube of film being processed and a second orifice 54 wherein the air is directed tangentially toward the film. This provides an advantage in that it allows better control of the amount of cooling gas introduced into the chamber 42.

In the FIG. 3, the same numbers are used to identify identical parts of the apparatus of the invention shown in the FIG. 1.

What is claimed is:

1. Apparatus for extruding a tubular film of a thermoplastic, polymeric resin, which comprises:
   extruder means for providing a thermally plasticized, thermoplastic polymeric resin;
   a shaping die associated with the extruder means, for shaping the thermally plasticized resin into a hollow tube of a substantially uniform first diameter and for discharging the shaped resin on a predetermined, axial pathway;
   a first annular nozzle radially disposed about the outer periphery of a pathway, at a point adjacent to the site of discharge;
   means of delivering a cooling gas to the annular nozzle for release to the outer periphery;
   said annular nozzle being constructed and positioned to direct the delivered cooling gas to the outer surface of the shaped resin at the site of discharge;
   a second annular nozzle radially disposed about the outer periphery of the pathway, at a point spaced apart from the first annular nozzle;
   second means for delivering a cooling gas to the second annular nozzle for release to the outer periphery, whereby the frost line of said tube forms just downstream of said second nozzle;
   said second annular nozzle being constructed and positioned to direct the cooling gas delivered by the second means to the outer surface of the shaped resin at a point spaced from the site of discharge;
   means for expanding the diameter of the thermally plasticized shaped resin at a point of the pathway beyond the first and second annular nozzles;
   a sleeve housing enclosing a portion of the pathway over which the thermally plasticized, shaped resin of expanded diameter travels, said housing extending from about said second nozzle to an opening downstream from said frost line, providing a zone of cooling gas flowing along said pathway downstream from said frost line;
   said sleeve housing defining an annular chamber between the housing and the periphery of the pathway portion over which the shaped resin of expanded diameter travels;
   said annular chamber being in fluid communication with the second annular nozzle; and adjustable vent means at said downstream opening for providing an adjustable vent between the annular chamber and the exterior of the sleeve housing.

2. The apparatus of claim 1 which further comprises surface inducing drag means positioned on the axial pathway.

3. The apparatus of claim 1 wherein the second annular nozzle is movable along a line parallel to the axial pathway, between a first position adjacent to the first annular nozzle to a second position distal to the first annular nozzle.

4. The apparatus of claim 1 wherein the sleeve housing is fabricated from a transparent material.

5. The apparatus of claim 1 wherein the vent means is adjustable.

6. The apparatus of claim 1 wherein the second annular nozzle includes a plurality of nozzle orifices, some of which are in direct fluid communication with the annular chamber.

7. A method for forming a blown tubular film of a synthetic polymeric resin, which comprises;
 thermally plasticizing the resin;
 shaping a progressively advancing, unexpanded tubular film of a substantially uniform first diameter from the thermally plasticized resin;
 moving the advancing tubular film over a predetermined axial pathway to take-up reel;
 applying a first cooling gas to the exterior of the advancing tubular film, at a first point on said pathway immediately as it is shaped so as to cool the shaped tubular film to a first temperature above the solidification temperature of the resin, but below melt temperature;
 applying a second cooling gas to the exterior of the cooled tubular film at a second point on said pathway downstream of said first point to further cool the resin to a second temperature above the solidification temperature of the resin;
 expanding the tube diameter to a second, substantially uniform diameter;
 passing a cooling gas axially in a zone around the expanded tubular film to solidify the resin, said zone extending from about said second point to a third point downstream from where the resin film solidifies; and
 controlling the velocity and volume of said passed cooling air by adjusting the radial dimension of said zone at said third point.

8. The apparatus of claim 1, wherein said adjustable vent means provides for adjusting the dimension of said opening.

9. The apparatus of claim 8, wherein said adjustable vent means comprises an iris shutter.

10. The apparatus of claim 1, wherein said sleeve housing extends from said second nozzle, and wherein said adjustable vent means provides for adjusting the dimension of said opening.

11. The apparatus of claim 10, wherein said adjustable vent means comprises an iris shutter.

* * * * *